United States Patent [19]

Sandford et al.

[11] 4,357,260

[45] Nov. 2, 1982

[54] DISPERSIBLE XANTHAN GUM COMPOSITE

[75] Inventors: Paul A. Sandford, Del Mar; John K. Baird, San Diego, both of Calif.

[73] Assignee: Merck & Co., Inc., Rahway, N.J.

[21] Appl. No.: 147,808

[22] Filed: May 8, 1980

[51] Int. Cl.³ .......................... B01F 3/12; C08L 5/00; C09J 3/02

[52] U.S. Cl. .................................. 252/363.5; 106/209; 252/316; 426/589; 426/590; 426/605; 435/104

[58] Field of Search ............................ 252/363.5, 385; 435/104; 106/209

[56] References Cited

U.S. PATENT DOCUMENTS

| | | | |
|---|---|---|---|
| 3,199,985 | 8/1965 | Mourey | 426/99 |
| 3,391,060 | 7/1968 | McNeely | 435/104 |
| 3,428,464 | 2/1969 | Pollard | 106/209 X |
| 3,433,650 | 3/1969 | Block et al. | 426/99 |
| 3,692,529 | 9/1972 | Rychman | 252/1 |
| 3,850,838 | 11/1974 | Guckenberger et al. | 252/363.5 |
| 4,016,337 | 4/1977 | Hsu | 426/99 |
| 4,185,088 | 1/1980 | Wagner | 424/78 |
| 4,214,912 | 7/1980 | Racciato et al. | 106/208 |

OTHER PUBLICATIONS

"Cabo-Sil Properties and Functions", Cabot Corp., Aug. 1975.

*Primary Examiner*—Richard D. Lovering
*Attorney, Agent, or Firm*—Gabriel Lopez; Hesna J. Pfeiffer

[57] ABSTRACT

Fumed silica is added to xanthan gum beer prior to normal isolation procedures. The xanthan gum obtained from this beer is characterized in that it is more readily dispersible than xanthan gum from regular beer. This dispersible xanthan gum does not require vigorous agitation to attain homogenous, lump-free solutions.

9 Claims, No Drawings

DISPERSIBLE XANTHAN GUM COMPOSITE

BACKGROUND OF THE INVENTION

Xanthan gum has been used widely to prepare a variety of aqueous solutions having high viscosity and good suspending properties. A difficulty with xanthan gum has been its resistance to dispersibility and hydration. Typically, xanthan gum powder must be subjected to high agitation, as in a typical kitchen blender, to get it to disperse and hydrate.

U.S. Pat. No. 4,016,337 teaches dry-mixing silicon dioxide with nondispersible material such as xanthan gum and then coating this admixture with an emulsion of edible fat and glycerol.

SUMMARY OF THE INVENTION

It has now been found that a fumed silica or micronsized silica aerogels or xerogels, when added to xanthan gum beer prior to isolation of the xanthan gum, produces a xanthan gum-silica composite of greatly enhanced dispersibility. The composite does not require vigorous agitation to obtain homogenous, lump-free aqueous solutions. This technique produces a dispersible product which is not contaminated with fat or glycerol. The weight of silica, based on weight of total solids, should range from about 5% to 50% to produce a dispersible product; i.e., the xanthan gum to silica ratio ranges from about 19:1 to 1:1.

DETAILED DESCRIPTION

Xanthan gum, as used herein, refers to the biosynthetic polysaccharide produced by the organism *Xanthomonas campestris* by the whole culture fermentation of a medium comprising a fermentable carbohydrate, a nitrogen source, and appropriate other nutrients.

Xanthan gum preparation is described in numerous publications and patents, e.g., U.S. Pat. Nos.

| | | | |
|---|---|---|---|
| 3,671,398 | 3,594,280 | 3,591,578 | 3,481,889 |
| 3,433,708 | 3,427,226 | 3,391,061 | 3,391,060 |
| 3,271,267 | 3,251,749 | 3,020,206 | |

Xanthan gum beer, which is a commercially available product, is the post-fermentation contents of xanthan gum fermentation vats prior to recovery of the gum.

The production of xanthan gum beer, the starting material in the practice of the present invention, by *Xanthomonas campestris*, NRRL B-1459, under a variety of fermentation conditions is well known. The inventive feature of this application relates to the addition of fumed silica or silica aerogel or xerogel to said beer after fermentation is complete, a process which is independent of the biosynthetic pathway of the Xanthomonas organism in its production of the beer. It would be apparent therefore to one skilled in the art that the invention is operative using either B-1459 or a proprietary mutant strain of *Xanthomonas campestris* known by applicant's assignee to produce xanthan gum is somewhat higher yields than does B-1459. Since the function of the microorganism is merely to produce said xanthan gum beer, availability of this mutant strain is not significant to the practice of this invention.

Fumed silicon dioxides are prepared by burning silicon tetrachloride in a flame of hydrogen and oxygen to produce primary spherical particles which, while still semi-molten, fuse into clusters of such particles called aggregates; these aggregates, during further cooling and collecting become physically entangled to form agglomerates. The latter, upon dispersion in an aqueous solution, can disentangle to reform aggregates. Fumed silicon dioxides so prepared are supplied in the form of light, fluffy, amorphous pure white, non-toxic, pharmacologically acceptable powders approved by FDA for use as a food additive, under the tradename Cab-O-Sil, by Cabot Corporation, 125 High St., Boston, Mass. Similar non-toxic, FDA approved, amorphous micronsized synthetic silicas are supplied under the tradename SYLOID silica aerogels and xerogels by W. R. Grace and Co., Davison Chemical Division, Charles and Baltimore Streets, Baltimore, Md. These aerogels and xerogels are prepared by the reaction of sulfuric acid and sodium silicate. The aerogels are highly porous solids formed by replacement of liquid in a gel by gas so that there is little shrinkage. The xerogels are porous solids formed from a gel by drying with unhindered shrinkage.

Fumed silica of large surface area is particularly preferred. For example, less fumed silica of $390 \pm 40$ m$^2$/gm surface, such as Cab-O-Sil EH-5, is needed to produce a dispersible xanthan gum than Cab-O-Sil M-5, which has a surface area of $200 \pm 25$ m$^2$/gm.

A variant process is to add the silica to an aqueous xanthan gum solution, i.e., a solution prepared from dried xanthan gum. Although this process produces a dispersible product it is less desirable than adding the silica to the beer because greater amounts of silica are required to produce a dispersible product if an aqueous solution is used.

The general process for producing the dispersible xanthan gum of this invention is to add approximately 1 gram of silica per 9 grams of xanthan gum to pasteurized gum beer. (Alternatively, the silica is added to the alchohol used for precipitation which is then added to the beer, the alcohol preferably being isopropanol, IPA.) The beer is then stirred for about 1 hour. Normal recovery of the gum then follows. Recovery comprises precipitation with about 2.5 volumes of IPA, press drying and then, oven drying of the precipitate at about 54° C., and then milling the dried powder. The exact amount of silica relative to xanthan gum will vary depending on the specific form of silica used. Generally, amounts of less than 5% fumed silica, based on weight of total solids, produces a final product which is not dispersible. Where a low surface area silica such as Cab-O-Sil M-5 is used, a minimum of about 10% silica is needed to produce a dispersible product.

Whether or not a xanthan gum product is dispersible is determined by Test Method I.

Test Method I

The precipitated and dried product is milled through a 60 (or 80) mesh screen. A 1.5 gm sample is added into a vortex formed in 150 ml synthetic tap water (1000 ppm NaCl, 100 ppm CaCl$_2$, in D.I. water), by stirring at 500 rpm with a 2" magnetic stirrer. Stirring continues for one minute. If lumps are present after stirring for one minute then the sample is designated as having poor dispersibility. If lumps are not present after stirring for one minute the sample is said to have excellent dispersibility and the sample is allowed to stir until there is no longer a vortex. The time from addition of sample to loss of vortex is called the hydration delay time.

The dispersible xanthan gum of this invention is useful wherever xanthan gum can be used, e.g., food, industrial and petroleum applications. It is particularly useful in applications where means of providing vigorous agitation are undesirable or unavailable, e.g., dry mixes, gravy, salad dressings, instant drinks, etc.

The invention is further defined by reference to the following examples, which are intended to be illustrative and not limiting.

EXAMPLE 1

Dispersible Xanthan Gum

Fumed silica is added to 300 g of 3% xanthan gum beer, (i.e., containing 9 g xanthan gum) in amounts varying from about 2.7 to 14.3% silica based on total solids. Isolation is carried out by precipitation with 2.5 volumes of IPA. The precipitate is dried for 2.5 hr. at 54° C. and then milled. Dispersibility is tested for according to Test Method I. Viscosity and pH are measured after stirring a 1% solution for 2 hrs. with a Lightnin' mixer. The data of Table 1 are obtained

TABLE 1

| Cab-O-Sil EH-5 | | Xanthan Gum-Silica Composite | | | |
|---|---|---|---|---|---|
| Gms | % Total Solids | 1% Vis.* (cP) | pH | Dispersibility | Hyd. Delay Time (min) |
| 0.25 | 2.7 | 1030 | 7.0 | Poor | NA |
| 0.50 | 5.3 | 1000 | 7.0 | Excellent | 6 |
| 0.75 | 7.7 | 1080 | 7.0 | " | 3.75 |
| 1.0 | 10.0 | 1086 | 6.9 | " | 5.8 |
| 1.25 | 12.2 | 970 | 6.8 | " | 4.5 |
| 1.50 | 14.3 | 900 | 6.8 | " | 3.5 |

*Brookfield LVF Viscometer, 60 rpm, spindle 3, room temp.
**NA—Not Applicable

EXAMPLE 2

Effect of Mesh Size

Following the procedure of Example 1 but using Cab-O-Sil M-5, silica levels of at least about 10% are required to produce excellent results. The results are independent of mesh size in the range 60–150 mesh as shown in Table 2, except for the hydration delay time.

TABLE 2

| | Xanthan Gum-Silica Composite | | | | |
|---|---|---|---|---|---|
| M-5 % Tot. Solids | 1% Vis.* (cP) | pH | 60 mesh | 150 mesh | HD Time (min.) |
| 0 | 1175 | 7.0 | Poor | Poor | NA** |
| 2.5 | 1200 | 7.4 | Poor | Poor | NA |
| 5.0 | 1170 | 7.5 | Poor | Poor | NA |
| 10.0 | 1184 | 7.4 | Exc. | Exc. | *** |

*Brookfield LVF viscometer, 60 rpm, spindle 3, room temp.
**NA—Not Applicable
***2 min. (60-mesh); 1 min. (150 mesh)

EXAMPLE 3

Addition to Xanthan Gum Solutions

Cab-O-Sil (M-5) is added to xanthan gum (KELTROL ®-Kelco Div., Merck & Co., Inc., San Diego, Calif.) solutions, then precipitated with IPA (2.5 volumes), dried (2.5 hr.), milled (60-mesh), and tested for dispersibility and hydration delay time. The data of Table 3 are obtained.

TABLE 3

| M-5 Wt. (g) | % Total Solids | KELTROL Wt. (g) | Dispers. | HD Time (min) |
|---|---|---|---|---|
| 5 | 10 | 45 | Poor | NA |
| 5 | 14.3 | 30 | Excellent | 6.8 |

EXAMPLE 4

Dry Blends of Silica and Xanthan Gum

Cab-O-Sil (M-5) and xanthan gum (KELTROL ®) are dry blended in various ratios and their dispersibilities checked. All the blends form lumps when added to water. The data of Table 4 are obtained.

TABLE 4

| Blend | Cab-O-Sil/xanthan gum (wt/wt) | Dispersibility |
|---|---|---|
| 1 | 0/100 | Poor |
| 2 | 10/90 | Poor |
| 3 | 20/90 | Poor |
| 4 | 4/72.1 | Poor |
| 5 | 100/0 | Poor |

We claim:

1. A process for producing a dispersible xanthan gum composite consisting essentially of xanthan gum and silica wherein the ratio xanthan gum to silica ranges from about 19:1 to 1:1 which comprises:
    (a) adding silica to a xanthan gum solution,
    (b) then isolating said composite from said solution, and
    (c) drying and milling the isolated composite.

2. The process of claim 1 wherein the silica is fumed silica and the solution is xanthan gum beer.

3. The process of claim 2 wherein the silica is first added to isopropanol to form a mix and then the mix is added to said xanthan gum beer.

4. A dispersible xanthan gum composite consisting essentially of xanthan gum and silica wherein the ratio xanthan gum to silica ranges from about 19:1 to 1:1, prepared by a process which comprises:
    (a) adding silica to a xanthan gum solution,
    (b) then isolating said composite from said solution, and
    (c) drying and milling the isolated composite.

5. The composite of claim 4 wherein the silica is fumed silica, silica aerogel, or silica xerogel.

6. The composite of claim 4 wherein the silica is fumed silica.

7. The composite of claim 6 wherein the fumed silica has a surface area of about $390 \pm 40$ m$^2$/gm.

8. The composite of claim 7 wherein the xanthan gum:silica ratio ranges from about 19:1 to about 6:1.

9. The composite of claim 8 wherein the xanthan gum:silica ratio is about 19:1.

* * * * *